(12) United States Patent
Golan et al.

(10) Patent No.: US 7,048,010 B2
(45) Date of Patent: May 23, 2006

(54) DRIP IRRIGATION SYSTEM

(75) Inventors: Rafi Golan, Ramat Hagolan (IL); Eli Vered, Emek Hefer (IL); Amnon Meisless, Emek Hefer (IL)

(73) Assignee: NETAFIM (A.C.S.) Ltd., Tel Aviv (IL)

(*) Notice: Subject to any disclaimer, the term of this patent is extended or adjusted under 35 U.S.C. 154(b) by 73 days.

(21) Appl. No.: 10/431,575

(22) Filed: May 8, 2003

(65) Prior Publication Data

US 2004/0222321 A1   Nov. 11, 2004

(51) Int. Cl.
   *F16L 11/00*   (2006.01)
(52) U.S. Cl. .................. 138/119; 138/118; 138/145; 239/542
(58) Field of Classification Search .............. 138/119, 138/118, 145, 146; 239/542
   See application file for complete search history.

(56) References Cited

U.S. PATENT DOCUMENTS

| | | | | |
|---|---|---|---|---|
| 2,750,232 A | * | 6/1956 | Szantay et al. | 239/268 |
| 3,753,527 A | | 8/1973 | Galbraith et al. | 239/11 |
| RE28,095 E | * | 7/1974 | Chapin | 405/44 |
| 3,830,067 A | * | 8/1974 | Osborn et al. | 405/45 |
| 3,863,980 A | | 2/1975 | Andersson | 285/39 |
| 3,888,418 A | * | 6/1975 | Seith et al. | 239/145 |
| 3,939,875 A | * | 2/1976 | Osborn et al. | 138/178 |
| 3,973,732 A | | 8/1976 | Diggs | 239/271 |
| 3,980,104 A | | 9/1976 | Kabai | 138/103 |
| 4,139,159 A | * | 2/1979 | Inoue et al. | 239/547 |
| 4,269,357 A | | 5/1981 | Menzel et al. | 239/272 |
| 4,391,410 A | | 7/1983 | Smith | 239/498 |
| 4,478,661 A | * | 10/1984 | Lewis | 156/92 |
| 5,622,211 A | | 4/1997 | Martin et al. | 138/177 |
| 6,120,850 A | * | 9/2000 | Kawazu et al. | 427/384 |

FOREIGN PATENT DOCUMENTS

| | | |
|---|---|---|
| DE | 33 21 091 A1 | 12/1984 |
| DE | 10043319 A1 | 3/2002 |
| GB | 2187622 A | 9/1987 |
| WO | WO-95/10177 A1 | 4/1995 |

* cited by examiner

*Primary Examiner*—Patrick Brinson
(74) *Attorney, Agent, or Firm*—Browdy and Neimark, PLLC

(57) ABSTRACT

Low-pressure drip irrigation system, comprising a distribution pipe made of thin-walled sleeve collapsible when empty and designed to operate under hydraulic head up to 3 m $H_2O$, having a plurality of holes in the walls thereof, a plurality of branch tubes equipped with low-pressure drip emitters; and a plurality of connectors connecting the branch tubes to the holes of the distribution pipe.

The sleeve material is opaque and reflecting the solar radiation so that the natural growth of microorganisms and algae in the irrigation water is suppressed, and the pipe is not heated more than 35° C. above the ambient air temperature.

The irrigation system is assembled in the field from components of a kit by deploying the distribution pipe, filling it with water, cutting the holes by means of a special band-held tool, inserting the connectors into the holes, and assembling the branch tubes with the connectors.

27 Claims, 7 Drawing Sheets

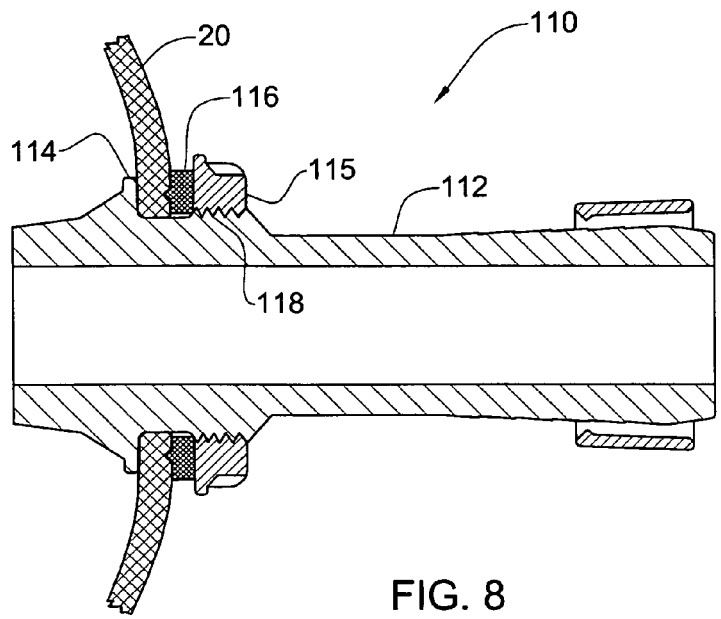
FIG. 8
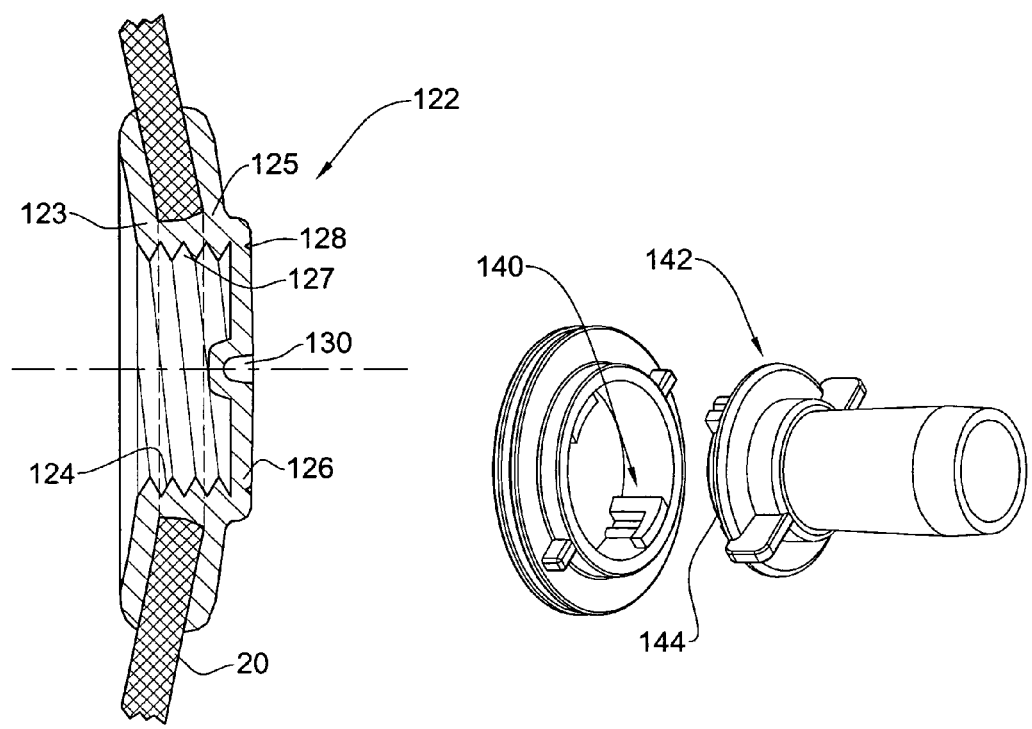
FIG. 9
FIG. 10

DRIP IRRIGATION SYSTEM

FIELD OF THE INVENTION

This invention relates to drip irrigation systems, more particularly to low-pressure irrigation systems.

BACKGROUND OF THE INVENTION

Known types of drip-irrigation systems use pressurized water sources of about 2 ata and more. Distribution pipes, fittings and valves in such systems are made of strong and relatively thick plastic materials. These systems are essentially independent on the field topography. However, pressure losses along their branching tubes with drip emitters are large, In order to achieve uniform dripping, special pressure-compensated emitters are used. These systems involve substantial investment costs and power consumption in operation.

On the other hand, systems for flood furrow irrigation are traditionally applied on large areas. They include open distribution channels and branching furrows made in the fields. Since water in such system flows only due to the gravitation force, all channels and furrows are maintained with, proper weak inclination. The flood irrigation requires less investment costs but the spending of water is huge. Moreover, the freely flowing water causes surface erosion and salinization of soils. Since recently, distribution channels are replaced by soft distribution pipes of large diameter with a plurality of openings which help to deliver irrigation water to the furrows without losses, pouring the water at the beginning of the furrow through the openings in the distribution pipe. These pipes are quite cheap and easily deployed; they may be used for one season and disposed of. However, water expenses still remain high.

SUMMARY OF THE INVENTION

According to the present invention, there is provided a low-pressure drip irrigation system, comprising:

a distribution pipe made of thin-walled sleeve collapsible when empty and designed to operate under hydraulic head up to 3 m $H_2O$, having a plurality of holes in the walls thereof, and having an upstream end connectable to a source of water;

a plurality of branch tubes equipped with low-pressure drip emitters; and a plurality of connectors, connecting the branch tubes to the holes of the distribution pipe.

The irrigation system further copses a gravity filtering tank connectable to a source of water, the tank being connected to the upstream end of the distribution pipe.

The irrigation system is preferably controlled by an automated system for the regulation of the hydraulic head of the irrigation water in the gravity filtering tank. This automated system includes a pressure sensor disposed at the distal end of one of the branch tubes, and the hydraulic head is regulated in dependence on readings obtained from the sensor.

The connectors used for assembling the above irrigation system have a nipple part for connecting to the branch tubes and a base part for connecting to the holes in the distribution pipe. The base part has a first and a second protruding collar and a narrow neck therebetween, the holes in the distribution pipe have diameters less than diameters of the respective necks. The connectors are each mounted in one of the holes with the first collar inside the distribution pipe so that the edge of the hole tightly embraces the neck of the connector, thereby securing the connector to the distribution pipe.

As an alternative embodiment, the neck of the connector may comprise a threaded portion while the second collar is formed as a separate member with internal, thread matching the threaded portion so that the second collar can seal the edge of the bole to the first collar by tightening up.

According to a second aspect of the preset invention, there is provided a thin-walled sleeve for use as distribution pipe, e.g. in the above irrigation system. The flow through the distribution pipe, under relatively low pressure and limited discharge through the drip emitters, is rather slow, typically between 0.02 and 0.8 m/s. Under such conditions, with conventional distribution pipes used in flood furrow irrigation, solar radiation in the field, penetrating through the pipe walls, promotes intensive growth of microorganisms and algae that are naturally present in the irrigation water. Such growth would soon lead to clogging of the drip emitters which usually have narrow water-passage labyrinths and small discharge openings. However, the distribution pipe of the present invention is made of opaque material that prevents light from entering into the pipe, thereby suppressing the growth of algae. Good results have been obtained with materials effectively stopping the visible and UV radiation and transmitting less than 5% of the IR radiation, Another problem related to the slow water flow in the distribution pipe is heating by the sun radiation. High temperature of the water in the pipe reduces the strength of the sleeve material and accelerates aging. For this reason, the sleeve material of the present invention is not only opaque but also is designed to reflect a major part of the sun radiation, about 20% and more. Thus, the distribution pipe, even with the small flow velocity mentioned above, is not heated to more than 30–35° C. above the ambient air temperature. Notably, this problem does not exist with higher pressure pipes and with the furrow irrigation pipes where flow velocity is much higher and the running water cools the pipes.

The pipe material is extendable in the area of the holes about 1.6 times of their initial diameter, but should not be over-extendable, in order to hold the connectors up to internal, pressure at least twice the operation pressure. The pipe material is also strong and deformable enough to endure overriding by wheeled vehicles with rubber tires when collapsed empty on non-rocky soil. Thus, it was found that material with total (elastic plus plastic) elongation before breaking of about 7.5 times would serve for more than one season of irrigation. Another feature of the material is that, when cut to obtain the holes, it provides accurate smooth edges of the hole.

The distribution pipe is preferably made of plastic material, such as polyolefin blend comprising polypropylene or polyethylene, about 0.2 to 2 mm thick. The plastic material is stabilized for long-term solar heating and UV protection. The reflectivity and opaqueness to light in the visible, UV and IR range are achieved by suitable additives, such as dispersed silver micro-particles. The plastic pipe wall may comprise an outer reflective layer and an inner opaque layer.

The distribution pipe may be manufactured with markings indicating places where the holes are to be made. The markings may comprise recesses providing stable positioning of a cutting tool, by which the holes are to be made.

In an alternative embodiment the distribution pipe may be manufactured with prefabricated holes for connecting the branch tubes. In such case, the holes may be equipped with annular rims made of rigid material, with thread or with bayonet locks for assembling to the connectors in the field.

The annular rims may have an integral cover adapted for easy removal in the field, e.g. a notch around the rim.

In yet another embodiment, the distribution pipe further comprises an internal filter membrane extending along the whole length of the pipe and dividing its cross-section into two chambers. The internal membrane filters the irrigation water passing between the two chambers.

According to a third aspect of the present invention, a kit is provided for assembling an irrigation system in the field, comprising:

a distribution pipe made of thin-walled collapsible sleeve with holes, or adapted for cutting therein holes, when filled with water, a plurality of connectors, adapted to connect the branch tubes to the holes cut in said distribution pipe; and optionally, a plurality of branch tubes equipped with low-pressure drip emitters.

According to a next aspect of the present invention, there is provided a hand-held tool for cutting holes in the distribution tube of the above irrigation system, comprising a tubular cutter with thin annular cutting edge formed with plurality of teeth, and a handle. The tool cuts holes by urging the cutter to the distribution tube which is filled with water, and rotating the tool. The tool may be powered by means of an electric drive with accumulator battery.

According to a still further aspect of the present invention, there is provided a method for assembly of a low-pressure drip irrigation system from the components of the above-described kit, in an irrigation field, the method comprising:

providing a source of water ensuring about 2 m $H_2O$ hydraulic head with respect to the field level;

deploying the distribution pipe in the field and connecting it to the source of water, filling the distribution pipe with water;

assembling one branch tube with one connector, if necessary, cutting a hole in the distribution pipe by means of the hand-held tool;

inserting the connector into the hole of the distribution pipe thereby attaching the branch tube to the pipe; and repeating the three last steps for the next branch tubes.

Thus, the present invention presents an irrigation system combining the economy, controllability and environmental friendliness of known drip-irrigation systems working at higher pressure, and the low investment costs of furrow irrigation systems. The system of the present invention is especially appealing by its simple method of assembly and the possibility to use the existing sources of water used in flood irrigation like artesian wells, surface run-off waters and others. Moreover, the irrigation system of the present invention can be directly assembled on existing fields to replace flood and furrow irrigation, with no additional earth-moving works.

With the new system any flood furrow irrigation field can be upgraded for increasing irrigation uniformity from around 60% to over 80% (the 20–30% difference means saving of water and energy) in the new system, allowing to benefit from potentially higher and better yields.

BRIEF DESCRIPTION OF THE DRAWINGS

In order to understand the invention and to see how it may be carried out in practice, preferred embodiments will now be described, by way of non-limiting examples only, with reference to the accompanying drawings, in which;

FIG. 8 is a sectional elevation of an alternative connector with threaded collar.

FIG. 9 is an axial sectional view of a hole in the distribution pipe, equipped with a rigid annular rim.

FIG. 10 is a perspective view of a rim with a suitable connector, for alternative use in the distribution pipe shown in FIG. 9.

DETAILED DESCRIPTION OF THE INVENTION

Figure 1:
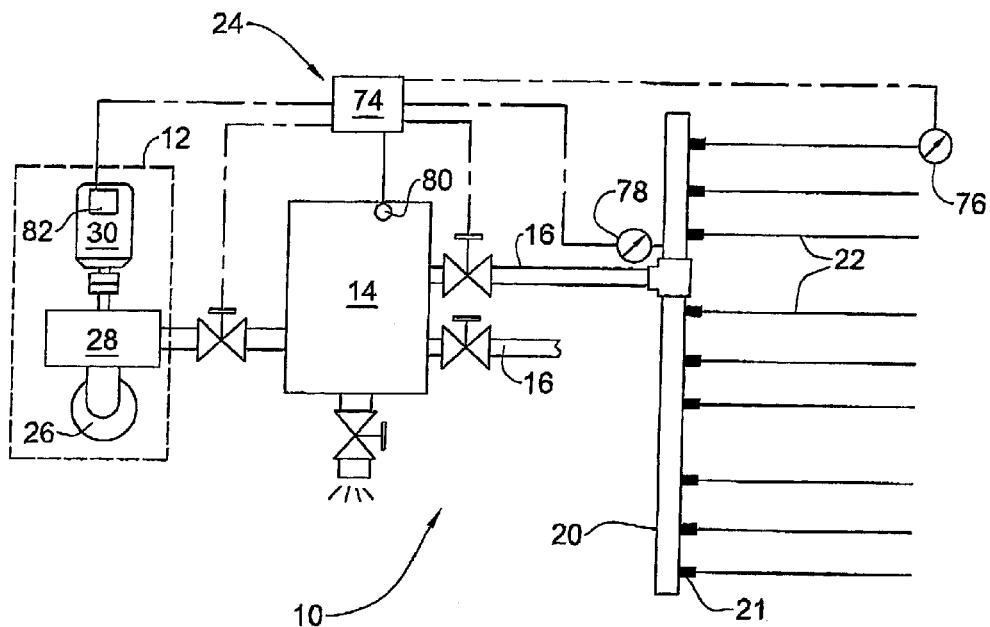
FIG. 1 is a schematic plan of the low-pressure drip irrigation system of the present invention.
Figure 2:
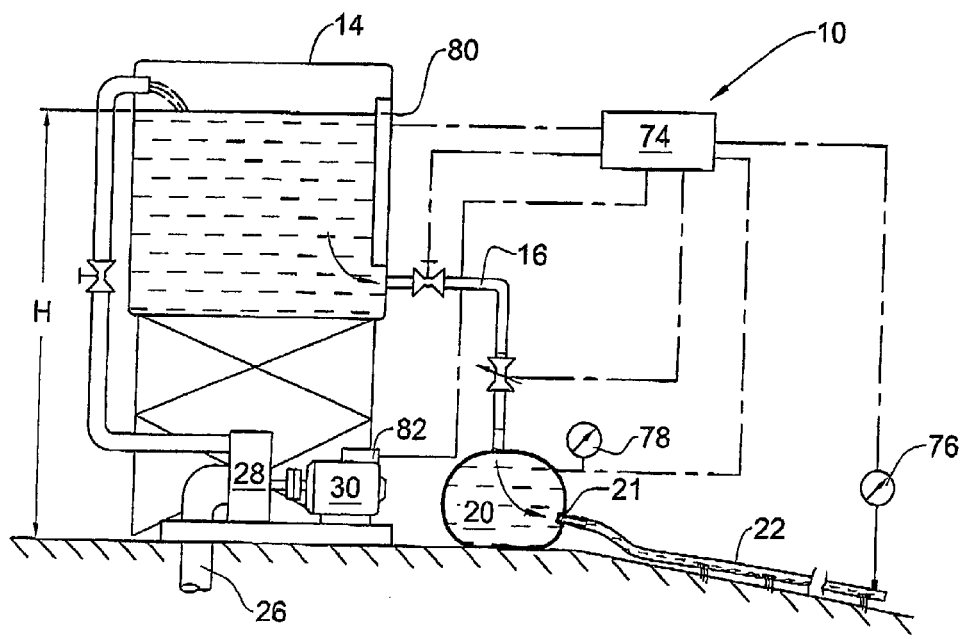
FIG. 2 is a schematic side view of the drip irrigation system of FIG. 1.

With reference to FIGS. 1 and 2, there is shown a low-pressure drip irrigation system 10, comprising a source of irrigation water 12, gravitation filter tank 14, outlet pipes 16, distribution pipes 20, connectors 21, branch tubes 22, and control system 24.

The source of irrigation water 12 in FIG. 1 is an artesian well 26 with a pump 28 and an electric drive 30, but may be any other suitable source. It is connected to the filter tank 14 which will be described in detail below. The filter tank 14 is connected to the pipes 20 by means of the outlet pipes 16.

Figure 3A:
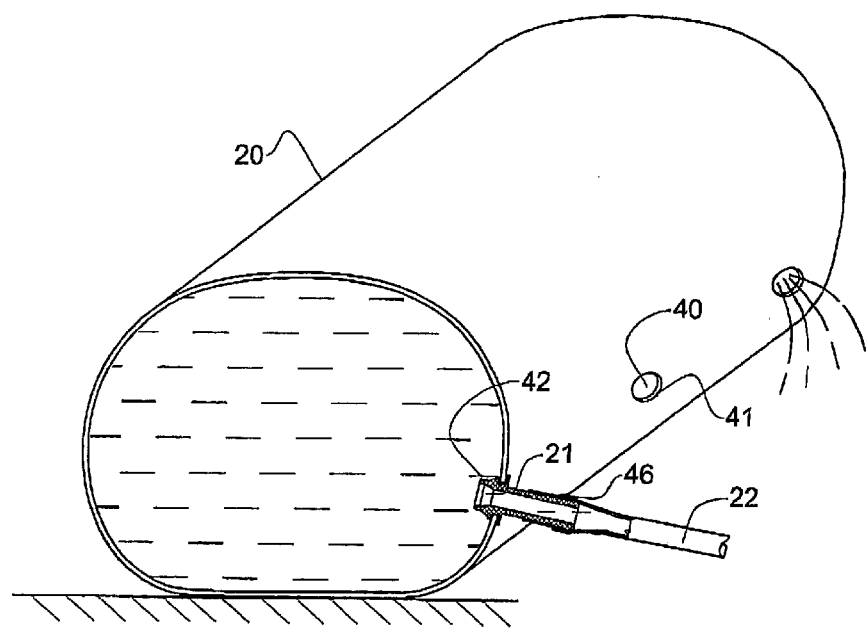
FIG. 3A is a cross-sectional view of the distribution pipe filled with water, with fitted connector and branch tube

With reference also to FIG. 3A, the distribution pipe 20 has a plurality of holes 40 with edges 41 which are tightly fixed to base parts 42 of the connectors 21. The pipes 20 are used in generally horizontal state, while the branch tubes 22 may be slightly inclined, so as to maintain approximately uniform bead in all drip emitters.

The distribution pipe 20 is made of thin-walled plastic collapsible sleeve designed to operate normally under hydraulic head H not exceeding 3 m $H_2O$ and to withstand accidental pressures up to about 6 m $H_2O$. Typically, the distribution pipe 20 has diameter between 75 and 500 mm when full of water, while the wall thickness of the collapsible sleeve is between 0.2 and 2 mm.

The plastic materials used for manufacturing of the sleeve of the distribution pipe are polyolefin blends stabilized for long-term solar heat and UV protection, comprising for example, polypropylene or polyethylene. The plastic material is largely opaque to most of the light in the visible, UV and IR range and has good reflectivity. The reflectivity is provided by using color additives, such as dispersed silver micro-particles. Also, the sleeve material may comprise an external light-colored reflective layer and an internal dark opaque layer.

The material of which the thin-walled sleeve of the distribution pipe 20 is made is fiddler capable of elastic expansion so as to allow penetration of the connector 21 when the latter is manually urged into the hole 40. The necessary elastic expansion is about 1.6 times the initial diameter of the hole 40 which is provided by elastic (Young) modulus of the sleeve material about 0.9–1.2 $N/mm^2$. However, the material should not be over-extendable, in order to hold the connectors at accidental deviations of the internal pressure. For example, a suitable pipe of 10 inch diameter, 0.8 mm wall thickness would hold connectors with neck diameter 18 mm at least up to pressure of 6 m $H_2O$.

The sleeve material endures overriding by wheeled vehicles with rubber tires when collapsed empty on sand, clay, mud or other non-rocky soil. It was found that a suitable sleeve material allowing about 250% elastic and 500% plastic elongation before breaking would serve for more than one season of irrigation. Furthermore, the material of the sleeve allows mechanical cutting of the holes 40 and obtaining accurate smooth edges 41 particularly when cut in the field, with the wall of the pipe 20 supported only by the water in the pipe.

Figure 4:
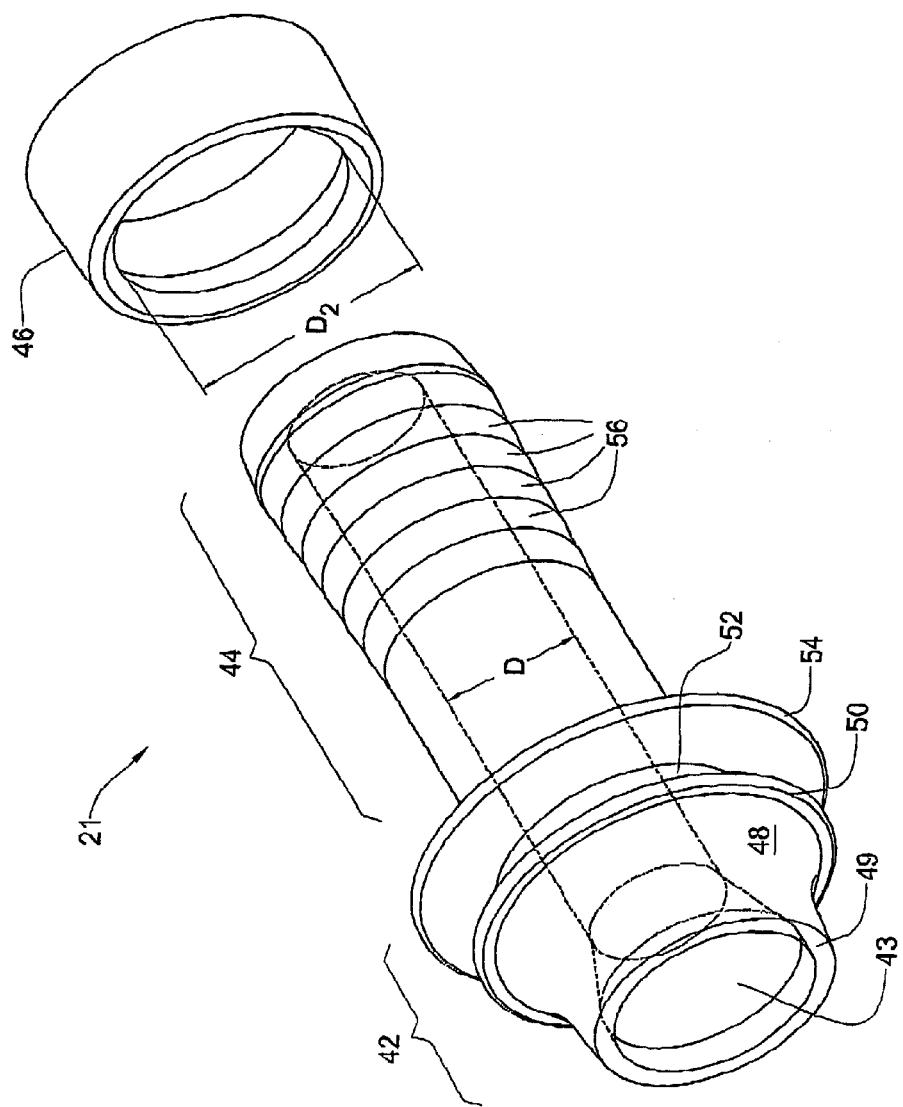
FIG. 4 is a perspective view of the connector used in the irrigation system of FIG. 1

With reference to FIG. 4, the connector 21 has an axial bore 43, a base part 42, a nipple part 44, and a locking ring 46. The base part 42 comprises a frustum section 48 starting with an annular edge 49 at a front end of the axial bore 43 and smoothly flaring into a first collar 50, a neck section 52 behind the first collar 50, and a second collar section 54 behind the neck section 52.

The frustum part 48 is formed so as to expand gradually the edge 41 of the hole 40 when the connector 21 is urged by hand in to the hole (see also FIGS. 7e–h). The neck section 52 is narrower than the first collar 50, whereby it can accommodate the edge 41, when the frustum part 48 is inside the distribution pipe. The neck 52 is however wider than the hole 40 in non-expanded state and provides a tight fit to the edge 41. The second collar 54 is wider than the first collar 50 so as to prevent further penetration of the connector 21 into the distribution pipe 20.

The diameter D of the bore 43 is most often between 10 and 45 mm. The hole 40 and the elements of the connector are then preferably sized as follows: the hole 40 has diameter between 0.8 and 1.0D, the first collar 50 has diameter between 1.4 and 1.7D, the neck 52 has diameter between 11 and 1.3D, and the second collar 54 has diameter greater than 1.9D.

The nipple part 44 is formed with a few steps 56 and slight flare towards the rear end of the bore 43 so as to hold tightly an inlet end of the branching tube 22 when forced over the nipple part.

The locking ring 46 has diameter D2 allowing passage over the widest step of the nipple part 44 but not allowing passage with the tube 22 on the nipple. Before assembling the tube 22 to the connector 21, the ring 46 is placed on the nipple part 44 close to the second collar 54. After the tube 22 is urged over the nipple part 44, the locking ring 46 is moved back to the rear end of the bore where, due to the flare of the nipple, it locks on the tube 22 and secures it to the nipple.

The branch tubes 22 are equipped with drip emitters 58 capable to work at low pressure, for example NETAFIM emitters "HyperTyphoon" or "Turbonet".

The branch tubes 22 are prefabricated in pieces of suitable length, possibly with connectors 21 pre-assembled at one end of the piece. The connectors may be bonded, welded or even integral with the tube.

Figure 5:
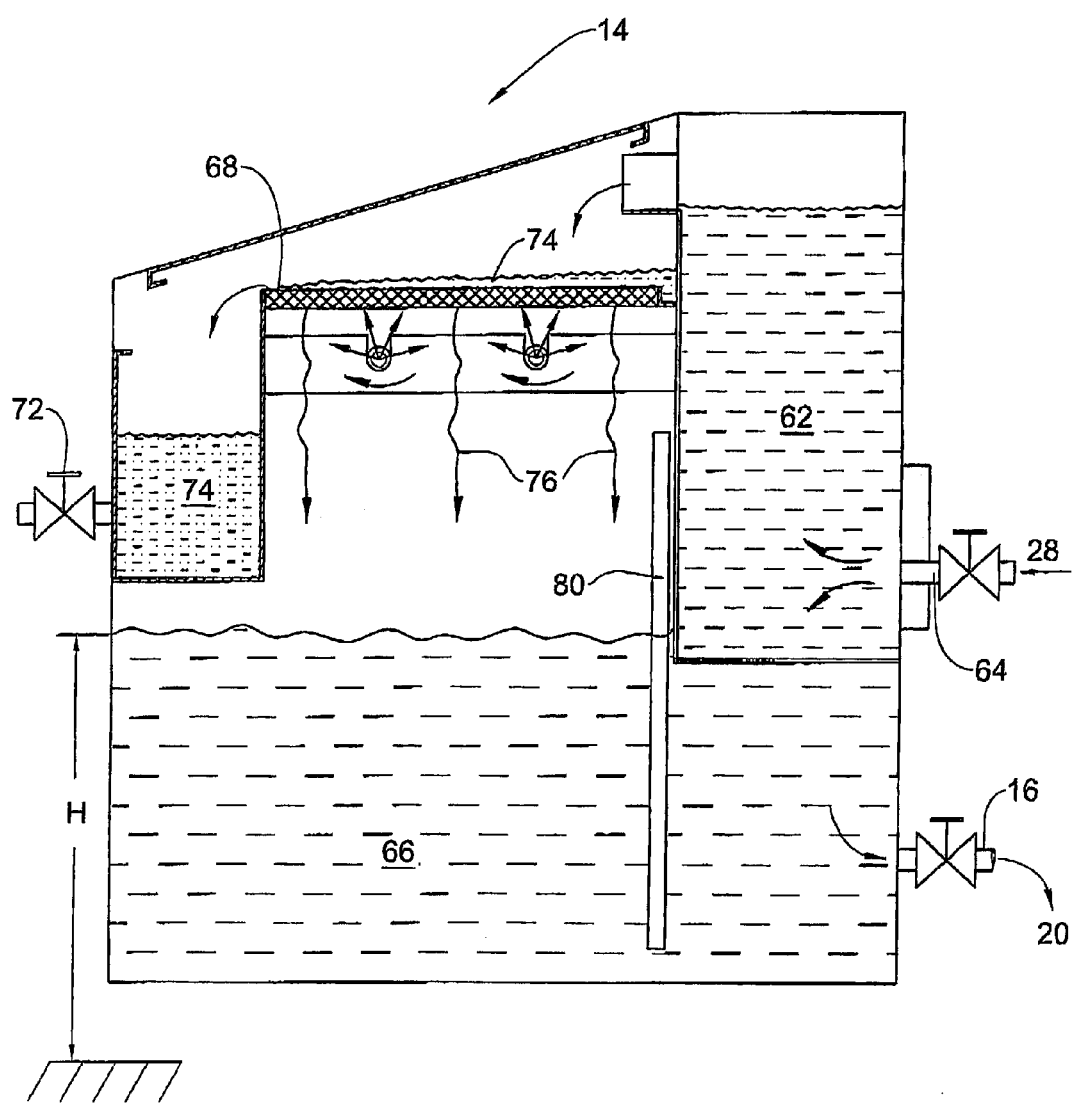
FIG. 5 is a cross-sectional elevation of the filtering tank used in the irrigation system of FIG. 1

With reference to FIGS. 5 and 2, the gravity filter tank 14 is raised on a support with adjustable height, within a range of 1–2 m. The tank is of the type Self Cleaning Gravity Screen Filtration System, manufactured by Fresno Valves & Castings, Inc., USA. The filter tank 14 comprises an inlet tank 62 with an inlet 64 connected to the source of water 12 (FIG. 1), a catch tank 66 connected to the outlet pipe 16, a filtering screen 68 with rotating jets 69 above the catch tank, and a trash tank 70 with discharge valve 72. The pump 28 feeds contaminated water from the source 12 to the inlet tank 62. The water falls on the filtering screed 68 which retains the contaminants 74 while filtered water 76 passes into the catch tank 66. Contaminants are forced to move towards the trash tank 70 by the horizontal flow of water over the screen, and by the rotating jets 69 that spray water through the screen from below. Contaminants accumulate in the trash tank 70 where they are periodically removed through the discharge valve 72. Clean water is directed through the piping 16 to the upstream end of the distribution pipe 20.

With reference to FIGS. 1, 2 and 5, the control system 24 of the irrigation system comprises an automated control block 74, pressure sensors (head indicators) 76 and 78, tank water level meter 79, pump control block 82, and communication lines. The pressure sensor 76 measures hydraulic head $H_2$ at the distal end of the branch tube 22, while the sensor 78 measures head $H_1$ in the distribution pipe 20. The head $H_2$ is usually the lowest pressure in the irrigation system 10, due to all hydraulic losses along the water flowpath and especially along the branch tubes 22.

The control system 24, as known in the practice of irrigation, is adapted to maintain a predetermined total operating head H in the system, which means a predetermined level of water in the catch tank 66, by operating the pump 30 in dependence of the readings of water level meter 79. In the low-pressure irrigation system of the present invention, the control system also maintains the minimal, head $H_2$ in predetermined limits by regulating the water level in the catch tank 66. That is, the total operating head H is raised or lowered in dependence of the readings of the pressure sensor 76 at the distal end of the branching tube 22.

The low-pressure irrigation system of the present invention will be better understood and its advantages will be made clearer if we describe a method of its assembly and a special tool used with the method.

Figure 6:
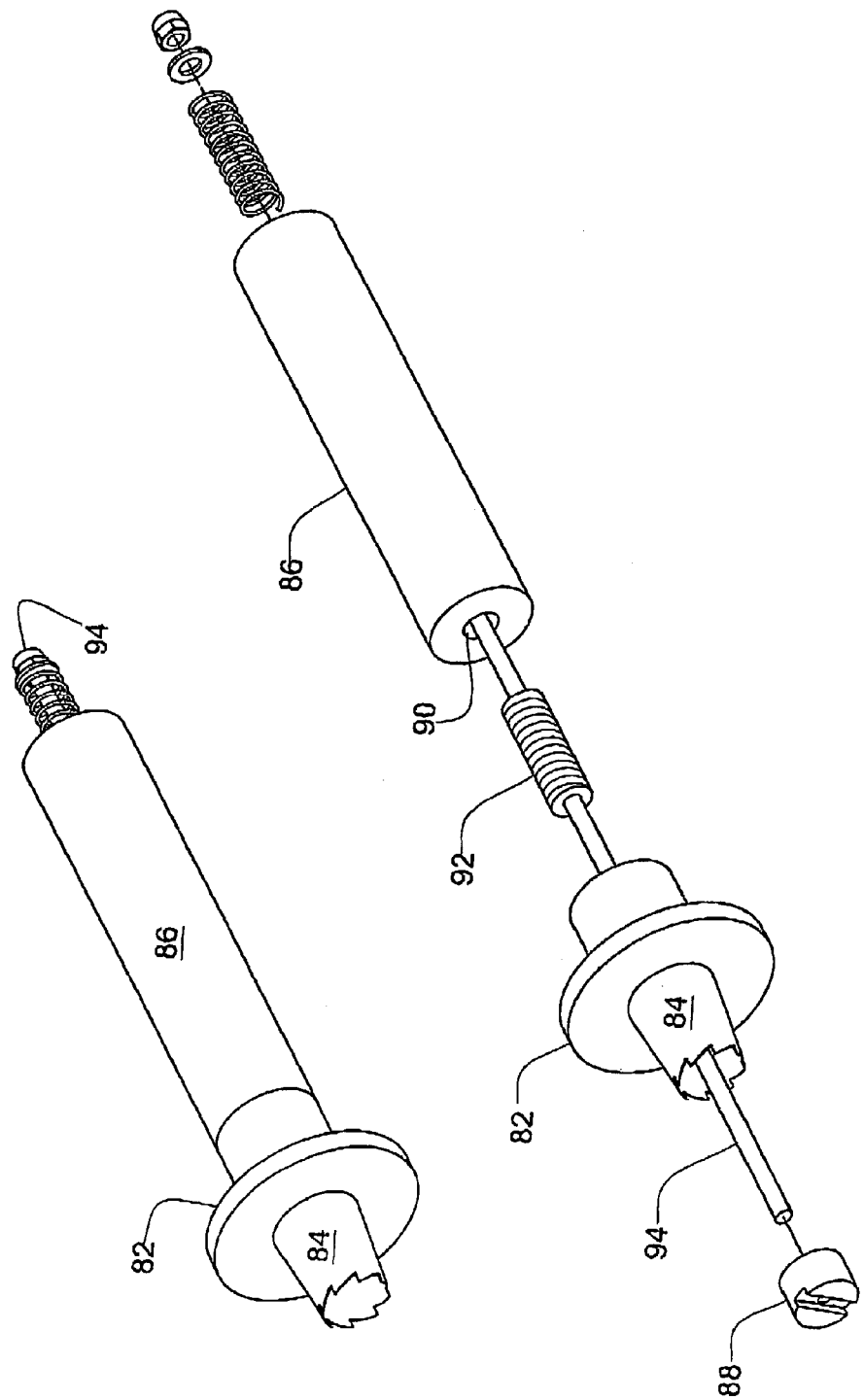
FIG. 6 is a perspective view, assembled and exploded, of a hand punch for cutting holes in the distribution pipe of FIG. 3A.

With reference to FIG. 6, an example is provided of a hand-held punch 80 for cutting holes in the distribution tube 20. The punch 80 comprises a tubular cutter 82 with thin annular cutting edge 84 formed with plurality of teeth, a handle 86, and a plunger 88. The handle 86 has a through axial bore 90 communicating with the inside of the tubular cutter 82. The handle 86 is firmly fixed to the tubular cutter 82 by a threaded sleeve 92. The plunger 88 is connected to a tail rod 94. The plunger 88 is movably accommodated inside the tubular cutter, with the tail rod obtained through the axial bore 90 and protruding out of handle 86.

In order to cut the holes 40 (see also FIG. 3A), the distribution pipe 20 is first filled with water to assume more or less stable form of a round cylinder. The punch 80 is slightly urged to the pipe 20 with the cutting edge 84 at the place of the desired hole. Then the punch 80 is rotated by hand to cut a portion of the pipe wall and to obtain the hole 40. The cut-out portions of material from tide pipe wall accumulate in the tubular cutter 82, and can be expelled therefrom by pressing said tail rod 94 and moving the plunger 88.

The punch 80 is a uniquely specialized tool with a major role in the overall efficiency of the assembly process of the irrigation system of the present invention. Its uniqueness is in the fact that the cutting edge 84 is so sharp and thin (though strong enough) that the punch 80 is able to cut holes with very light pressure on the material of the pipe wall which is supported from inside by the water pressure which does not exceed 3 m $H_2O$ in the moment of cutting. Thus, the punch 80 allows the holes 40 to be cut by hand, in a collapsible pipe that has no rigidity of its own and which is deployed in the field.

It will be understood that the punch tool 80 may be designed and manufactured with powered drive for rotation, for example electric with accumulator battery, pneumatic and so on.

The components of the irrigation system described above may constitute a kit comprising at least two of the following components: the distribution pipe 20, the branch tubes 22 equipped with low-pressure drip emitters, the connectors 21 and the hand-held punch 80 provided for cutting the holes in the distribution pipe.

Figure 7:
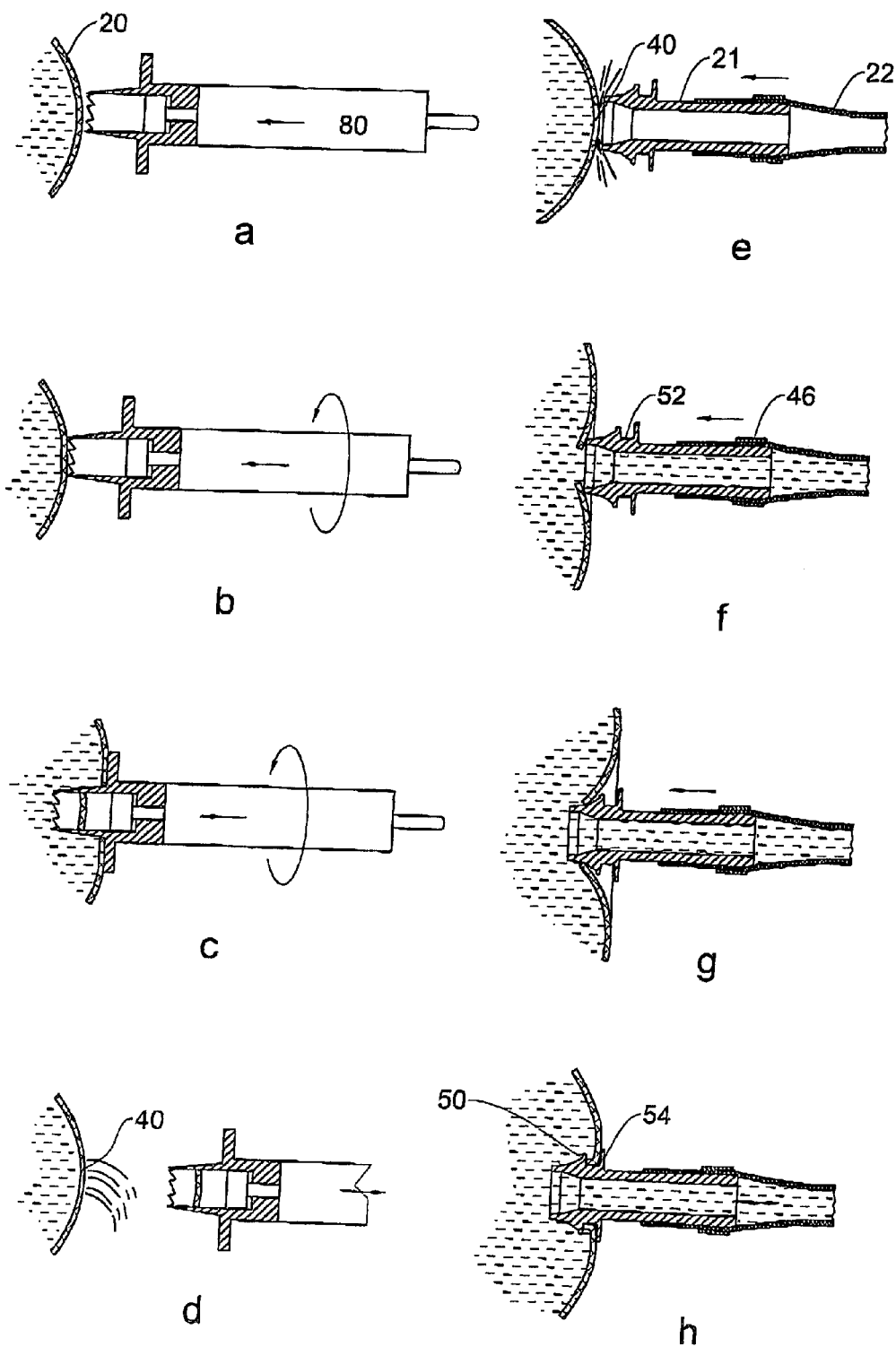
FIG. 7 is a series of sectional views of the distribution pipe of the present invention illustrating the process of cutting a hole and assembling a connector.

With reference to FIGS. 2, 3A and 7, the method for assembly of the low-pressure drip irrigation system from the components of the kit comprises:

deploying the distribution pipe 20 in the field and connecting it to a source of water ensuring 2–3 m $H_2O$ hydraulic head with respect to the field level, for example tire filter tank 14 of FIG. 2;

filling the distribution pipe 20 with water, assembling one of the branch tubes 22 with the nipple part 42 of the connector 21, as described above;

cutting a hole 40 in the distribution pipe 20 by means of the hand-held punch 80;

inserting the connector 21 into the hole 40, thereby attaching the branch tube 22 to the pipe 20; and repeating the last three steps for the rest branch tubes.

It should be understood that in the time interval between cutting the hole 40 and inserting the connector 21 into the bole, the water is flowing through the hole 40 as a free jet. However, due to the low working pressure, the spilled quantity of water is insignificant, and the jet cannot prevent the manual insertion of the connector, nor the connector may be forced out after the insertion. Also, the above steps may be performed in a different order, for example the branch tube 22 may be assembled to the nipple part of the connector 21 after the latter is inserted into the hole 40.

The assembly of the branching tubes to the distribution pipe may be provided in other alternative ways. With reference to FIG. 8, there is shown a connector 110 comprising a body 112 with a first collar 114, a separate second collar 115 and a sealing ring 116. The connector body 112 is formed with external thread 118 matching respective internal thread in the collar 115. Thus, the second collar 115 can seal the edge of the bole 40 against the first collar 114 by tightening up the thread 118.

The distribution pipe may be prefabricated with holes punched therein or with holes marked thereon. The holes may be disposed at predetermined intervals along the distribution pipe where the intervals may be defined in terms of practical range of distances between crop rows in the field or just in meters (feet).

With reference to FIG. 9, there is shown the wall of a distribution pipe 120 with a prefabricated hole, which is equipped with an annular rim 122 made of rigid material and having an axis A. The rim has an inner portion 123 axially protruding into the pipe's interior, an outer portion 125 protruding outwardly from the pipe, and an intermediate portion 127 therebetween the axial extension of which corresponds to the thickness of the pipe. The outer portion 125 has an axial extension shorter than total axial extension of the inner and intermediate portions 123 and 127, and the inner portion 123 of the rim has an axial extension shorter than the total axial extension of the intermediate and outer portions 127 and 125. The rim 122 has a threaded portion 124, for assembling to a connectors in the field. As shown in FIG. 10, instead of threading, bayonet lock 140 may be used, for assembling to a connector 142, in which case base part 144 of the connector is formed accordingly.

The annular rims 122 have an integral cover 126 preventing water flow through the hole before assembly. The integral cover 126 is surrounded by a tearable peripheral notch 128 for easy removal, A simple tool may be used to cut along the notch 128. The recess 130 provides support for a totaling tool tip.

The rims 122 are tightly fitting the edges of the holes and are installed therein before deploying the irrigation system in the field, e.g. fitted in the process of pipe extrusion. The rims are sufficiently thin so as to allow rolling the collapsed pipe into a tight reel.

Figure 3B:
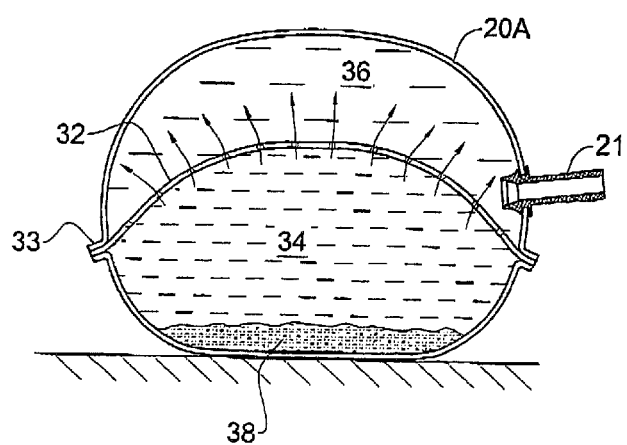
FIG. 3B is a cross-sectional view of an alternative distribution pipe with internal filtering membrane.

With reference to FIG. 3B, the distribution pipe 20A may be provided with an internal filtering membrane 32 extending along the whole length of the pipe. The pipe cross-section is thus divided into a supply chamber 34 and exit chamber 36. The internal membrane 32 is made of micro-holed polyethylene sheet or of non-woven material. The whole pipe is assembled by welding along seams 33 by bead or heat welding. In operation, muddy irrigation water is fed into the supply chamber 34, then passes gradually through the internal membrane 32 along the whole length of the pipe 20A, enters into the exit chamber 36 and then into the connectors 21. Mud particles are retained by the membrane and can settle as silt 38 in the lower part of the pipe due to the low flow velocity. Since the distribution pipe is several hundred meters long, the filtering area is huge and the pipe normally does not need flushing throughout the irrigation season. At the end of the season, the pipe 20A can be flushed by feeding water in reverse direction (into the exit chamber 36) and opening the distal end of the supply chamber 34.

Although a description of specific embodiments has been presented, it is contemplated that various changes could be made without deviating from the scope of the present invention as defined in the following Claims.

The invention claimed is:

1. A water-irrigation distribution pipe made of a sleeve collapsible when empty, with diameter at least three inches when filled with water, and designed to operate under hydraulic head up to 3 m $H_2O$, wherein said sleeve is made of polyolefin blend material of thickness 0.2 to 2.0 mm, with silver micro-particles dispersed therein, reflecting at east partially the solar radiation, said sleeve providing that, at flow velocity of said irrigation water in the pipe between 0.02 and 0.1 m/s, said pipe is not heated more than 35° above the ambient air temperature.

2. The distribution pipe of claim 1, wherein said material reflects at least 20% of the solar radiation in the visible spectrum.

3. The distribution pipe of claim 1, wherein said material is at least partially impervious to solar radiation, thereby suppressing the natural growth of microorganisms and algae in said irrigation water, so that when said distribution pipe is used in association with branch tubes having drip emitters, said growth would not block said drip emitters.

4. The distribution pipe of claim 3, wherein said material is effectively impervious to UV and visible radiation, and transmits less than 5% of the IR radiation.

5. The distribution pipe of claim 1, wherein said material is capable to endure overriding by wheeled vehicles with rubber tires when collapsed empty on non-rocky soil.

6. The distribution of claim 1, wherein said material is capable, when cut to obtain the holes for connecting the branch tubes, to provide accurate smooth edges of said holes.

7. The distribution pipe of claim 1, wherein said material is extendable in the area of said holes at least 1.6 times their initial diameter.

8. The distribution pipe of claim 1, wherein said material is plastic sheet of thickness 0.2 to 2.0 mm.

9. The distribution pipe of claim 8, wherein said plastic is a polyolefin blend.

10. The distribution pipe of claim 9, wherein said polyolefin blend comprises polypropylene or polyethylene.

11. The distribution pipe of claim 1, wherein said material comprises an outer reflective layer and an inner opaque layer.

12. The distribution pipe of claim 1, wherein said pipe is prefabricated with holes for connecting branch tubes.

13. The distribution pipe of claim 12, wherein said holes are equipped, before assembling the irrigation system in the field, with annular rims made of rigid material, said rims tightly fitting the edges of said holes and having means for assembling to connectors in the field, while said pipe with said rims is capable of being collapsed and rolled into a tight reel.

14. The distribution pipe of claim 13, wherein said means for assembling is a threaded portion of said annular rim.

15. The distribution pipe of claim 13, wherein said means for assembling is a bayonet lock formed in said annular rim.

16. A water-irrigation distribution pipe made of a sleeve collapsible when empty, with diameter at least three inches when filled with water, and designed to operate under hydraulic head up to 3 m $H_2O$, wherein said sleeve is made of material adapted to reflect at least partially the solar radiation so that, at flow velocity of said irrigation water in the pipe between 0.02 and 0.1 m/s, said pipe is not heated more than 35° above the ambient temperature; wherein said pipe is prefabricated with holes for connecting branch tubes;
wherein said holes are equipped, before assembling the irrigation system in the field, with annular rims made of rigid material, said rims tightly fitting the edges of said holes and having means for assembling to the connectors in the field, while said pipe is capable of being collapsed and rolled into tight reel;
wherein said annular rims have an integral cover preventing water flow through said hole, and a means allowing easy removal of the cover in the field before the assembly of said connectors.

17. The distribution pipe of claim 16, wherein said mean for easy removal of the integral cover is a notch around said integral cover.

18. The distribution pipe of claim 1, further comprising internal membrane extending along the whole length of the pipe and dividing the cross-section thereof into two chambers, said internal membrane being adapted to filter the irrigation water passing between said two chambers.

19. The distribution pipe of claim 18, wherein said internal membrane is made of micro-holed polyethylene sheet or of non-woven material.

20. A water irrigation distribution pipe according to claim 13, wherein each rim has an axis and inner, outer and intermediate portions extending therealong, the inner portion protruding into the pipe's interior, the outer portion protruding outwardly from the pipe, and an intermediate portion therebetween, the outer portion having an axial extension shorter than total axial extension of the inner and intermediate portions.

21. A water irrigation distribution pipe according to claim 20, wherein the axial extension of the inner portion of the rim is shorter than total axial extension of the intermediate and outer portions.

22. A water irrigation distribution pipe according to claim 20, wherein the means for assembling the rim to a connector is located at least in the intermediate portion of the rim.

23. A water irrigation distribution pipe according to claim 20, wherein the means for assembling the rim to a connector is located at least partially in the inner portion of the rim.

24. A water-irrigation distribution pipe made of a sleeve collapsible when empty, with diameter at least three inches when filled with water, and designed to operate under hydraulic head up to 3 m $H_2O$, said sleeve having prefabricated holes for connecting branch tubes, equipped, before assembling the irrigation system in the field, with annular rims being made of rigid material, said rims tightly fitting the edges of said holes and having means for assembling to connectors in the field, said rims being sufficiently thin to allow rolling the pipe, when collapsed, into a tight reel.

25. A water-irrigation distribution pipe made of a sleeve collapsible when empty, with diameter of at least three inches when filled with water, and designed to operate under hydraulic head up to 3 m H2O, wherein said sleeve is made of material adapted to reflect at least partially the solar radiation so that, at flow velocity of said irrigation water in the pipe between 0.02 and 0.1 m/s, said pipe is not heated more than 35° C. above the ambient air temperature, material of said sleeve being extendable in the area of said holes at least 1.6 times their initial diameter.

26. A water-irrigation distribution pipe according to claim 25, wherein said material has silver micro-particles dispersed therein.

27. A water-irrigation distribution pipe according to claim 25, wherein said material is polyolefin blend material.

* * * * *